United States Patent [19]
Goto

[11] Patent Number: 4,594,161
[45] Date of Patent: Jun. 10, 1986

[54] REVERSE OSMOSIS SEALING MEANS
[75] Inventor: Hideo Goto, Koshigaya, Japan
[73] Assignee: Yamato Scientific Co., Ltd., Tokyo, Japan
[21] Appl. No.: 539,254
[22] Filed: Oct. 5, 1983
[30] Foreign Application Priority Data Oct. 15, 1982 [JP] Japan .................. 57-155083[U]

[51] Int. Cl.$^4$ ............................................. B01D 13/00
[52] U.S. Cl. ................................. 210/433.2; 210/450
[58] Field of Search ............... 210/416.1, 433.2, 450, 210/453, 34.1, 257.2

[56] References Cited

U.S. PATENT DOCUMENTS

| | | | |
|---|---|---|---|
| 3,225,929 | 12/1965 | Sicard | 210/453 X |
| 3,282,434 | 11/1966 | Pall | 210/453 X |
| 3,846,295 | 11/1974 | Gibbs | 210/257.2 X |
| 4,070,280 | 1/1978 | Bray | 210/450 X |
| 4,169,789 | 10/1979 | Leret | 210/433.2 X |
| 4,219,426 | 8/1980 | Spekle et al. | 210/450 X |

Primary Examiner—Frank Spear
Attorney, Agent, or Firm—Thomas & Kennedy

[57] ABSTRACT

Sealing means for a reverse osmosis system includes an approximately cylindrical body (103) open at one end and including an outwardly stepped portion (109) at its open end which receives a cylindrical rim (121) of a cover (107). An O-ring seal (123) is seated in an annular groove (125) of the cylindrical rim and includes an outwardly projecting annular tongue (123B) which engages and seals against the inner surface of the stepped portion (109) of the cylindrical body (103). Annular filter element (105) is positioned in an upright attitude in the cylindrical body (103) and fluid moves through inlet opening (31) of the cover (107), then downwardly into the outer portion of the cylindrical body, then through the annular filter, then upwardly through the cover to an outlet (135). The liquid then moves through the other elements of the reverse osmosis system, including a boiler (29) and condenser (33), to storage tank (35).

4 Claims, 7 Drawing Figures

REVERSE OSMOSIS SEALING MEANS

BACKGROUND OF THE INVENTION

This invention relates to water treatment equipment using the reverse osmosis process and, more particularly, reverse osmosis equipment which is capable of being applied without any change of a pumping efficiency.

DESCRIPTION OF THE PRIOR ART

Conventionally, in order to obtain pure water by distillating raw water, the reverse osmosis process has been used as a pretreatment method of raw water. When the reverse osmosis process is employed to obtain pure water, in order to prevent waste operation of a pump from happening, a relatively large tank of raw water generally has been installed at the entrance side of the pump for recycling raw water used in the reverse osmosis device to the raw water tank. As a result, the conventional equipment is relatively large in size and raw water to be repeatedly supplied to the reverse osmosis device is inconveniently gradually condensed.

SUMMARY OF THE INVENTION

An object of the present invention is to provide novel reverse osmosis equipment which is compact in its whole size because no raw water tank is used for the purpose of preventing the pump from wasteful operation, in spite of exclusion of the raw water tank, and in which apparatus raw water is not condensed.

Briefly described, these and other objects and advantages are accomplished by a provision of reverse osmosis equipment comprising a reverse osmosis device, a pump, a bypass pipe installed between the reverse osmosis device and the pump, and a control valve on the pipe for controlling the flow rate from the pump to the osmosis apparatus.

DETAILED EXPLANATION OF THE PREFERRED EMBODIMENT

Figure 1:
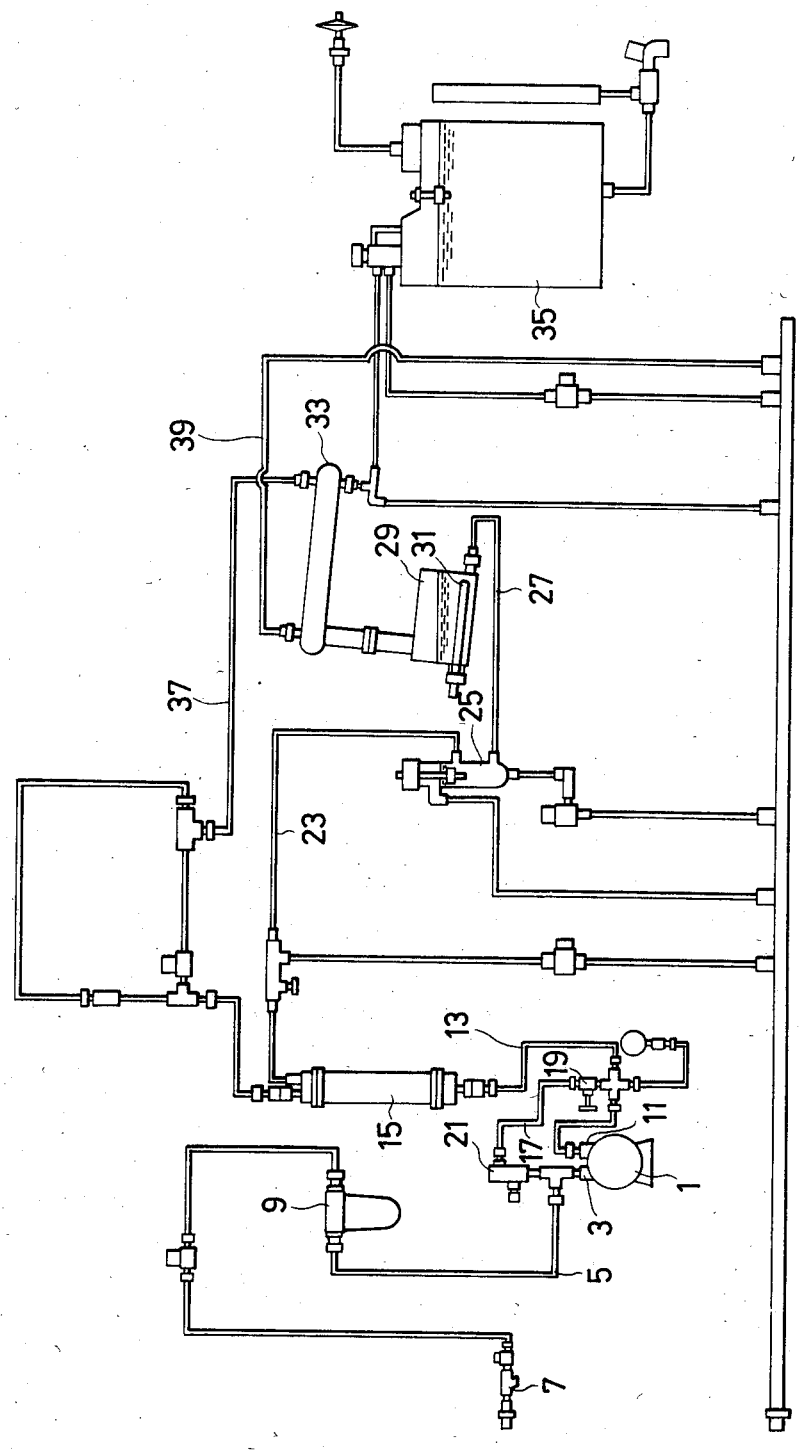
FIG. 1 is schematic illustration of an embodiment of the water treatment system according to the present invention, which is used as a pretreatment apparatus of a distillation installation.

Referring now to the drawings, the equipment using the reverse osmosis process as a pretreatment step of a distillation apparatus for obtaining pure water by distilling raw water is illustrated in FIG. 1, in which a water suction port 3 of a pump 1 is connected to a raw water supply portion through a water suction pipe 5. The raw water drawn from the raw water supply portion to said pump is filtered through a strainer 7 and a filter 9. A discharge outlet 11 of said pump 1 is connected to a reverse osmosis device 15 through a connecting pipe 13. A bypass pipe 17 communicates with connecting pipe 13 and the bypass pipe 17 is directly connected to the side of the water suction port 3 of the pump 1. As a result, the raw water that flows from the discharge outlet 11 of the pump 1 is partly supplied to the reverse osmosis device 15 and a part of the raw water is recycled to the side of the water suction port 2.

Additionally, the recycling volume of raw water to be recycled to the water suction port 3 side can be adjusted by controlling a flow rate control valve 19 such as a needle valve installed in the bypass pipe 17, and can be detected by a water level detector 21. The water level detector 21, the detailed construction of which is not described herein, is employed to detect the liquid or water level of the raw water within a small reservoir. When the recycling volume of raw water recycled from the bypass pipe 17 lessens and the liquid level of raw water within the reservoir is lowered more than the predetermined height, the water level detector 21 detects the low level and stops an operative function of said pump 1.

The reverse osmosis aparatus 15 is a conventional type employing reverse osmosis phenomenon which uses a semipermeable membrane. Pure water filtered through this reverse osmosis device 15 is supplied to a boiler 29 through a connecting pipe 23, a liquid or water level control apparatus 25 and a connecting pipe 27, and warmed by a heater 31 contained in the boiler 29. Steam generated in the boiler 29 is condensed in a condenser 33 to obtain water of higher purity and the pure water generated in the condenser 33 is stored in a tank 35.

Raw water condensed through said reverse osmosis device 15 is supplied to said condenser 33 through a connecting pipe 37, as a coolant, and then drained through a drain pipe 39.

It is necessary to always apply a pressure higher than the osmotic pressure to raw water within said reverse osmosis device 15 and it is preferable to constantly keep the pressure at its suitable level. However, when the efficiency of the pump 1 is too high or low, the pressure within the connecting pipe 13 is, as a result, changed and the pressure within the reverse osmosis device 15 is apt to be changed.

The shortcomings described above with reference to the conventional apparatus will be solved by this invention, an embodiment of which has, as clearly shown in FIG. 1, the connecting pipe 13 and the bypass pipe 17 which is divided from the connecting pipe 13 connected to the water suction port 3 of the pump 1.

A needle valve such as a flow control valve 19 is installed in the bypass pipe 17, so that the flow rate of raw water moving to the reverse osmosis device 15 can be controlled by controlling the flow control valve 19 to control the pressure of raw water. Consequently, even though efficiency of the pump 1 changes or pulsates, the pressure of raw water within the reverse osmosis device 15 can be correspondingly always kept at almost a constant value. Additionally, because a part of the raw water is directly recycled to the water suction port 3 of the pump 1, raw water cannot be sufficiently condensed, any conventional raw water tank can be omitted, and waste operation of the pump 1 can be prevented from happening.

Figure 2:
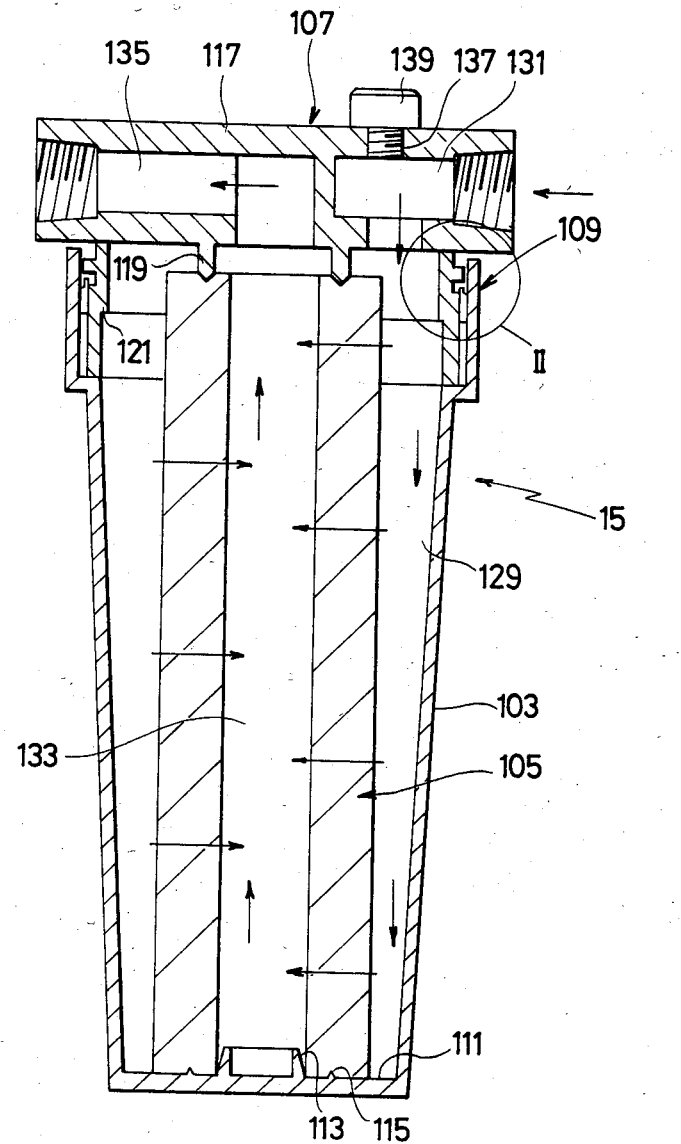
FIG. 2 shows a sectional view of a filter apparatus according to the present invention.

The reverse osmosis device 15 shown in a shape of its sectional view in FIG. 2 comprises mainly a cylindrical body 103, a filter 105, and a cover member 107.

Figure 3:
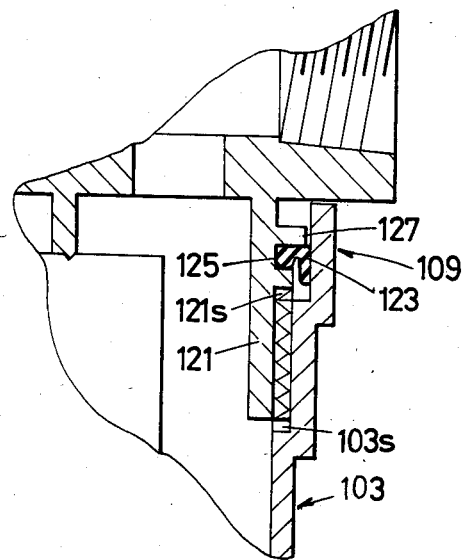
FIG. 3 is a partial sectional view of the circled portion 109 in FIG. 2.

The cylindrical body 103 has at its end a stepped portion 109 enlarged toward the outer end and a lower end portion gradually thined and closed to make a shape of a truncated cone. At the center of the inner side of the closed lower end of the cylindrical body 103, a fixing longitudinally extended guide 113 of a truncated conical ring shape is formed to restrict any movement of the filter 105. At the outside of the fixing guide 113 a ring-like filter fixing extrusion 115 whose section is of a triangle shape is formed. As shown in FIG. 3 in detail, the stepped portion 109 of the cylindrical body 103 is enlarged in its diameter more than that of the threaded portion 103S formed on the inner surface at the top end portion of the cylindrical body 13.

The filter 105 has a cylindrical shape opened at both the ends and the filter 105 proper is known, so that a detailed explanation of it is omitted.

The cover member 107 may be of a suitable shape such as a disc or a square and, at about the central inner side of a body portion 117, a ring-like fixing extrusion 119 is formed for fixing the filter 105 and placing it or sandwiching it between the extrusion and the filter fixing extrusion 115.

At the outside of the ring-like fixing extrusion 119, a cylindrical portion 121 is formed. At the outer periphery face of a top end of the cylindrical portion 121, a threaded portion 121S is formed, which is engagable with a threaded portion 103S on the cylindrical body 103. Furthermore, at a base side outer periphery face of the cylindrical portion 121, a ring-like engagement groove 125 is formed for keeping a packing such as a seal member 123, and a stepped portion 127 of a larger diameter than that of the threaded portion 121S is also formed.

The seal member 123 comprises its base portion 123A positioned in an engagement groove 125 and a tongue member 123B contacting an inner face of the stepped portion 109 of the cylindrical body 103. The tongue member 123B has an end portion of a thickness considerably thinner than the base portion 123A and is made flexible. A dent portion 123C is formed between the tongue member 123B and the base portion 123A of the seal member 123 in order to make the tongue member 123B easily and firmly contact the inner face of the stepped portion 109.

Figure 5:
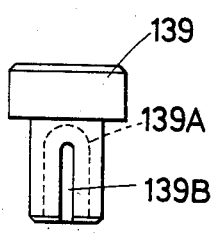
FIG. 5 is an enlarged frontal view of a blind stopper.

On the body portion 117 of the cover member 107, a raw water inlet 131 communicates with a raw water chamber 129 formed between the cylindrical body 103 and the filter 105, and a filtered liquid outlet 135 communicates with a filtered liquid or water chamber 133 situated inside of the filter 15. In an air vent 137 formed in the raw water inlet 131, a blind stopper 139 is engaged. As shown in FIG. 5, along an axial line of the blind stopper 139, a hole 139A is formed and an oval hole or a slit 139B communicates with the hole 139A is formed on its periphery.

The operation of the system constructed according to the present invention, as illustrated in FIG. 1, may now be described. During the initial stage in which raw water is supplied from the raw water inlet 131 to the raw water chamber 129, the blind stopper 139 is held at its slight-released condition to vent the raw water chamber 129 with the outside through the slit 139B. As a result, air within the raw water chamber 129 escapes to the outside and raw water can be easily suplied to the original water chamber 129. After air within the cylindrical body 103 is extracted, the blind stopper 139 is fastened and secured. As described above, raw water is supplied from the raw water inlet 131 to the raw water chamber 129 in the cylindrical body 103, then raw water is filtered through the filer 105 and enters into a filtered water chamber 133. The filtered liquid is taken out through a filtered water outlet 135.

Figure 4:
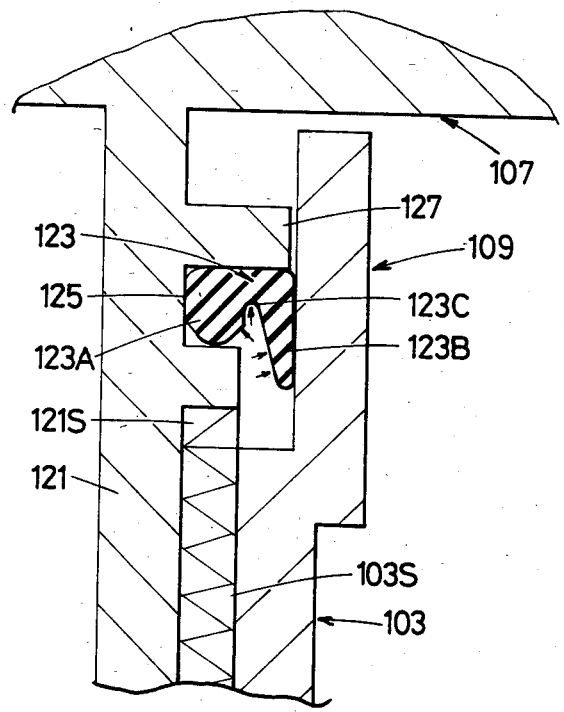
FIG. 4 is an enlarged sectional view of a seal member.

When the pressure in the raw water chamber 129 is raised to a high level after raw water is supplied to the chamber 129, sealing condition between the filter 105 and the inner face 111 of the thin or narrow end of the cylindrical body 103, and the filter 105 and the cover member 107 are respectively apt to be broken. According to the present invention, both the top and the bottom ends of the filter 105 are firmly sealingly positioned by means of the fixing projections 115 and 119, so that complete and effective sealing conditions are attained there. Similarly, a good sealed condition between the cylindrical body 103 and the cover member 107 is necessary and the good sealed condition is attained by using the seal member 123 arranged, as shown in FIGS. 3 and 4, at an engagement portion of the cylindrical body 103 and the cover member 107.

Since pressures are applied to the seal member 123 as shown by the arrows, the tongue member 123B of the seal member 123 are firmly pressed to the peripheral inner face of the stepped portion 19 of the cylindrical body 113 and simultaneously the base portion 123A of the seal member 123 is contacted with the shelf portion 127 of the cover member 107.

Consequently, the higher the inner pressure of the raw water chamber 129 and the filtered water chamber 133, the stronger the contacting force of the seal member 123 with the inner face of the stepped portion 119 and the cylindrical portion 121 thereby improving the sealing efficiency between them. The seal member 123 has a diameter larger than that of the threaded portion 121S, so that the seal member 123 is never bitten by the threaded portion 121S during the assembly or disassembly operation of the cylindrical body 103 to the cover member 107.

Figure 6:
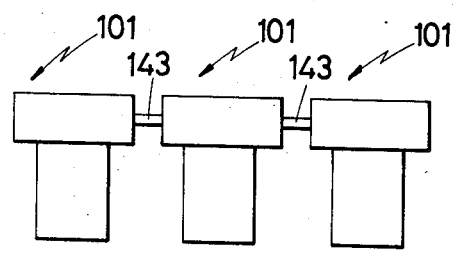
FIG. 6 shows a plurality of the filters connected in series.
Figure 7:
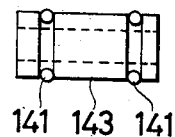
FIG. 7 shows a frontal view of a connector for the filter.

When a plurality of the filters 105 are necessary to be connected to each other and used as shown in FIG. 6 the raw water inlet 131 and the filtered water outlet 135 are made of the same diameter and a plurality of pipe-like connectors 143 have O-rings 141 at both the ends thereof are used in order to connect the filters easily and promptly (see FIG. 7).

According to another embodiment of the reverse osmosis device of the present invention, it is preferable to change the cylindrical portion 121 of the cover member 107 to the place of the cylindrical body 103 or to place the base portion 123A of the seal member 123 at the side of the stepped portion 109 of the cylindrical body 103 in spite of the side of the cylindrical portion 121 of the cover member 107.

What is claimed is:

1. A reverse osmosis device for purifying raw water comprising:
   a generally cylindrical body having one end closed and the other end opened, said cylindrical body formed with a female thread on the inner periphery of said opened end,
   a filter means provided within said cylindrical body, said filter means being of elongated annular shape and forming with said cylindrical body a peripheral region to be filled with raw water and a central region for receiving water through said filter from said peripheral region,
   a cover member mounted on said opened end of said cylindrical body and defining an inlet in communication with said peripheral region and an outlet in communication with said central region, said cover member comprising an axially extending annular flange which is provided on its outer surface with a male thread engaged with the female thread on the inner periphery of said opened end of the cylindrical body, said annular flange being formed with a radially extending annular projection on its outer surface at a position displaced from the male thread toward the opened end of said cylindrical body; and a flexible annular seal member mounted on the outer surface of said annular flange in contact with a surface of the annular projection which faces said male threads, said seal member having a ring-like concavity toward which the fluid pressure of said cylindrical body is applied and being shaped so as to be urged against the annular projection and the outer surface of said annular flange and the inner periphery of the opened end portion of said cylindrical body by fluid pressure inside said cylindrical body to render the seal member effective when the inside of said cylindrical body is subjected to high pressure.

2. A reverse osmosis device claimed in claim 1, wherein said flexible annular seal member is engaged with an annular groove which is formed on the outer surface of said cover member adjacent the male thread.

3. A reverse osmosis device claimed in claim 2, wherein said female thread of said cylindrical body is formed on the inner surface of an upper stepped portion of said cylindrical body which is attached to the upper extreme end of and adjacent the opened end of said cylindrical body.

4. A reverse osmosis device claimed in claim 3, wherein the inner cylindrical surface of said cylindrical body is formed flush with the inner surface of the annular flange of said cover member.

* * * * *